United States Patent [19]

Umpleby

[11] Patent Number: 4,795,786
[45] Date of Patent: Jan. 3, 1989

[54] POLYMER COMPOSITION

[75] Inventor: Jeffrey D. Umpleby, Ferney-Voltaire, France

[73] Assignee: BP Chemicals Limited, London, England

[21] Appl. No.: 140,943

[22] Filed: Dec. 24, 1987

Related U.S. Application Data

[63] Continuation of Ser. No. 890,879, Jul. 25, 1986, abandoned, which is a continuation of Ser. No. 775,190, Jul. 15, 1985, abandoned.

[30] Foreign Application Priority Data

Jul. 20, 1984 [FR] France ................................ 84 18592

[51] Int. Cl.$^4$ ............................................ C08F 30/08
[52] U.S. Cl. .................................. 525/326.5; 525/342; 526/279; 264/83; 264/174; 264/331.13; 264/331.15
[58] Field of Search .............................. 525/326.5, 342; 526/279; 264/331.13, 331.15, 83, 174

[56] References Cited

U.S. PATENT DOCUMENTS

| | | | |
|---|---|---|---|
| 3,225,018 | 12/1965 | Zutty | 528/481 |
| 3,392,156 | 7/1968 | Donaldson | 526/232 |
| 4,297,310 | 10/1981 | Akutsu et al. | 525/326.5 |
| 4,368,297 | 1/1983 | Kato et al. | 525/342 |
| 4,397,981 | 8/1983 | Doi et al. | 525/209 |
| 4,399,261 | 8/1983 | Kato et al. | 525/342 |
| 4,444,948 | 4/1984 | Hochstrasser et al. | 525/101 |
| 4,477,628 | 10/1984 | Kato et al. | 526/279 |

FOREIGN PATENT DOCUMENTS 1526398 9/1985 United Kingdom .

OTHER PUBLICATIONS

Hackh's Chemical Dictionary, Fourth Edition (1972), p. 712.

*Primary Examiner*—Melvyn I. Marquis
*Attorney, Agent, or Firm*—Brooks Haidt Haffne & Delahunty

[57] ABSTRACT

A crosslinkable composition comprising (A) a copolymer of ethylene and an unsaturated silane compound having hydrolyzable group(s) optionally with other comonomers and (B) a defined dihydrocarbyl tin (IV) carboxylate compound as silanol condensation catalyst. The tin compound is preferably dibutyl tin maleate. The composition can be thermoformed to produce articles having improved surface finish.

16 Claims, No Drawings

POLYMER COMPOSITION

This application is a continuation of application Ser. No. 890,879, filed July 25, 1986, which is a continuation of Ser. No. 755,190 filed on July 15, 1985, now both abandoned.

The present invention relates to crosslinkable organic polymer compositions. More particularly the present invention is concerned with compositions comprising crosslinkable copolymers which are prepared by copolymerising unsaturated organic monomers with unsaturated silane compounds containing hydrolysable groups.

It is known that organic polymers containing hydrolysable silane groups can be crosslinked by the action of water, preferably in the presence of a so-called silanol condensation catalyst. A number of methods are known for producing such crosslinkable organic polymers. One method comprises copolymerising unsaturated organic monomers with unsaturated silane compounds containing hydrolysable groups. Examples of this method are described in GB-A-2028831 and GB-A-2039513 which disclose the preparation of crosslinkable copolymers of ethylene and an ethylenically unsaturated silane compound by copolymerising the monomers at relatively high temperatures and pressures in the presence of a radical polymerisation initiator. Another example of this copolymerisation method is described in GB-A-1415194 which discloses the preparation of crosslinkable copolymer by contacing ethylene, optionally with other olefinically unsaturated comonomer, and a terminally unsaturated silane compound with certain defined Ziegler catalysts under polymerisation conditions which preferably employ relatively low temperatures and pressures.

It is also well-known that polymers crosslinkable by the action of water and a silanol condensation catalyst can be prepared by grafting an unsaturated silane compound on to a (preformed) polyolefin, but the present invention is not concerned with graft polymers of this type.

Crosslinkable organic copolymers having hydrolysable silane groups and made by the copolymerisation method (hereinafter referred to as "silyl copolymers") can be fabricated to form a large variety of useful articles by conventional techniques, for example, extrusion, injection moulding, blow-moulding and film-blowing processes. The crosslinking step is generally carried out subsequent to fabrication of the article because the crosslinked polymer cannot in general be satisfactorily thermoformed.

A problem encountered with silyl copolymers is that during storage or thermoforming operations the polymer can undergo premature crosslinking and this can lead to difficulties in the fabrication of articles from the polymer or to the production of articles having unsatisfactory physical and mechanical properties. The problem of crosslinking during storage may be reduced by ensuring that the silyl copolymers are maintained in a moisture-free environment and by keeping the silanol condensation catalyst (or other additives known to promote crosslinking) separate from the polymer until the fabrication step is preformed. A technique frequently employed in the art is to make up a concentrated masterbatch containing the silanol condensation catalyst and other additives if any, in an organic polymer which does not spontaneously crosslink and which is compatible with the silyl copolymer, and to blend this masterbatch with the silyl copolymer during or just prior to thermoforming of the desired article. The fabricated article is then exposed to water, steam or moist air to cause crosslinking.

Problems resulting from premature crosslinking during thermoforming are more difficult to overcome. One method of reducing premature crosslinking proposed in GB-A-1357549 is to mould or extrude articles from silyl copolymers (or alternatively from polymers grafted with hydrolysable silane compound) in the absence of the silanol condensation catalyst and then to contact the produced article with an aqueous dispersion or solution of a tin carboxylate to cause the crosslinking.

It is an object of the present invention to provide an improved crosslinkable silyl copolymer composition. It is a further object of the present invention to provide a crosslinkable silyl copolymer composition which exhibits a reduced tendency to undergo premature crosslinking during the fabrication of articles therefrom.

Accordingly, the present invention provides a crosslinkable composition comprising:

(A) A silyl copolymer prepared by copolymerising ethylene and an unsaturated silane compound having one or more hydrolysable groups, optionally together with one or more other monomers copolymerisable therewith, and (B) A silanol condensation catalyst comprising a dihydrocarbyl tin (IV) carboxylate compound characterised in that the carboxylate units in the tin compound are provided by a dicarboxylic acid.

The present invention further provides a process for preparing a crosslinkable composition by blending together components comprising:

(A) silyl copolymer prepared by copolymerising ethylene and an unsaturated silane compound having one or more hydrolysable groups, optionally together with one or more other monomers copolymerisable therewith, and (B) A silanol condensation catalyst comprising a dihydrocarbyl tin (IV) carboxylate compound characterised in that the carboxylate units in the tin compound are provided by a dicarboxylic acid.

The carboxylate units in the tin compound are provided by a dicarboxylic acid having the general formula HOOC.X.COOH wherein X is a divalent organic group which preferably contains 1–12, most preferably 1–6 carbon atoms. Examples of suitable divalent groups (X) are methylene, alkyl or aryl substituted methylene, polymethylene, alkyl or aryl substituted polymethylene, unsaturated straight or branched chain groups and substituted or unsubstituted phenylene groups. Examples of suitable dicarboxylic acids are oxalic, malic, maleic, fumaric, adipic, sebacic and phthalic acid. Maleic acid is particularly preferred.

The hydrocarbyl groups in the dihydrocarbyl tin (IV) compound can be the same or different and are preferably alkyl groups containing 1–6 carbon atoms. A particularly preferred dihydrocarbyl tin (IV) compound is dibutyl tin (IV) maleate.

The dihydrocarbyl tin compound can be a monomeric tin compound (i.e. a tin compound containing one atom of tin per molecule) or in the form of dimeric or polymeric tin compounds (i.e. compounds of tin containing two or more atoms of tin per molecule). The monomeric tin compounds can be, for example, cyclic diesters represented by the general formula:

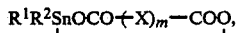

or acyclic diesters represented by the general formula:

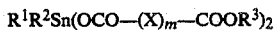

wherein $R^1$, $R^2$ and $R^3$ are the same or different hydrocarbyl groups, preferably alkyl groups containing 1 to 6 carbon atoms and X is an organic divalent group as described above. The value of m is zero or one. The dimeric or polymeric tin compounds can be, for example, cyclic or acylic compounds built up from units of the above monomeric tin compounds and linked together via the dicarboxylates and tin functions.

The dihydrocarbyl tin (IV) carboxylate employed in the present invention preferably contains less than 0.1 mole of free carboxylic acid groups per atom of tin andd is most preferably substantially free from such uncombined carboxylic acid groups.

The manufacture of tin compounds of the type referred to above is well known from the prior art. They can be made, for example by reacting dicarboxylic acid esters (or half esters) with dihydrocarbyl tin dichlorides.

The quantity of the tin compound employed in the composition of the present invention is suitably in the range 0.001 to 3.0 moles, preferably 0.003 to 0.05 moles (based on atom of tin) per mole of silyl units in the silyl copolymer. Generally speaking, the quantity of the tin compound is in the range 0.001 to 10% by weight, preferably 0.01 to 5% by weight, for example, 0.03 to 3% by weight based on the weight of the silyl copolymer in the composition.

The silyl copolymers employed in the present invention are prepared by copolymerising ethylene and an unsaturated compound having one or more hydrolysable groups, optionally together with one or more other monomers copolymerisable therewith.

The unsaturated silane compound copolymerised with the ethylene, is preferably a compound having the general formula $R^4SiR^5_nY_{3-n}$ wherein $R^4$ represents an ethylenically unsaturated hydrocarbyl or hydrocarbyloxy group; $R^5$ represents an aliphatic saturated hydrocarbyl group; Y represents a hydrolysable organic group; and n represents zero, 1 or 2. $R^4$ can be, for example, vinyl, allyl, isopropenyl, butenyl, cyclohexenyl or gamma-methacryloxypropyl. Y can be, for example, methoxy, ethoxy, formyloxy, acetoxy, propionyloxy, alkylamino or arylamino. $R^5$ can be, for example, methyl, ethyl, propyl, hexyl, octyl, decyl or phenyl. $R^4$ is preferably a vinyl group, Y is preferably methoxy, ethoxy or acetoxy. Preferred unsaturated silane compounds for use in making the copolymer are vinyl trimethoxy silane, vinyl triethoxy silane and vinyl triacetoxy silane.

The silyl copolymer suitably contains 0.1-10 weight %, preferably 0.5 to 5 weight % of copolymerised units of the unsaturated silane compound (based on copolymer).

The one or more other optional monomers copolymerisable with the ethylene and the unsaturated silane compound can be selected from, for example, vinyl esters, alkyl (meth)acrylates, olefinically unsaturated carboxylic acids or derivatives thereof and vinyl ethers. Examples of suitable (optional) copolymerisable monomers are vinyl acetate, vinyl butyrate, vinyl pivalate, methyl acrylate, ethyl acrylate, butyl acrylate, methyl methacrylate, methacrylamide, methacrylonitrile, vinyl methyl ether and vinyl phenyl ether. The quantity of the optional copolymerisable monomer present in the silane copolymer can be, for example, up to 40 weight %, preferably up to 25 weight % of copolymer.

The silane copolymer is preferably prepared by free radical initiated copolymerisation of the monomers. Preferably the copolymerisation is carried out under high pressure, for example, 500 to 4000 bars and at a temperature in the range 150° to 400° C. These polymerisation conditions are well known in the manufacture of conventional low density polyethylene (including ethylene/vinyl acetate and ethylene/ethyl acrylate copolymers) using autoclave or tubular reactors and such conventional polymerisation conditions and apparatus can generally be employed in the manufacture of the silyl copolymer.

For further details of the production of silyl copolymers suitable for use in the present invention reference may be made to GB-A-2028831, GB-A-2039513, U.S. Pat. No. 3,225,018 and U.S. Pat. No. 3,392,156.

The tin compound can be incorporated into the crosslinkable composition of the present invention using any of the blending or mixing techniques employed in the art. For example the tin compound can be mixed directly with solid pellet or granular silyl copolymer, optionally with other additives, and then melt blended or directly extruded to give crosslinkable products. A preferred method for incorporating the tin compound into the silyl copolymer employs a masterbatch technique. For example the tin compound is compounded with a thermoplastic polymer to form a masterbatch concentrate and the latter is then blended with the silyl copolymer. Examples of thermoplastic polymers suitable for preparing the masterbatch are LDPE, LLDPE, ethylene/ethyl acrylate copolymer and ethylene vinyl acetate copolymer. The masterbatch concentrate can also contain other additives which it is desired to incorporate into the final composition.

The composition of the present invention can contain additives conventionally employed in the art. Examples of such additives are antioxidants, fillers, metal deactivators (e.g. salicylaldehyde oximes), lubricants, water-tree inhibitors, foaming agents, flame retardants and pigments. Additives of this type are conventionally incorporated into the composition either directly or by a masterbatching technique. The composition can also be blended with other compatible polymeric materials, for example, polyethylene, polypropylene, ethylene/ethyl acrylate copolymer and ethylene/1-olefin copolymer.

In a particularly preferred embodiment of the present invention, the crosslinkable composition comprises the defined silyl copolymer and the defined silanol condensation catalyst together with a phosphorus compound containing at least one P-R group wherein R is a hydrogen atom or an organic substituent bonded to P (phosphorus atom) via a carbon or oxygen atom and wherein the phosphorus is trivalent or pentavalent, preferably trivalent. Examples of suitable classes of phosphorus compounds are organic phosphites, organic phosphonites, organic phosphines and organic phosphine oxides. Preferred compounds are trialkyl phosphites, for example tributyl phosphite, tri-n-hexyl phosphite, tri-isooctyl phosphite, trinonyl phosphite and di-isooctyl phosphite. When such phosphorus compounds are employed in the composition of the present invention they are suitably present in an amount in the range 0.001 to 3.0, preferably 0.003 to 0.05 moles of silyl units in the silyl copolymer. Such phosphorus compounds can be incorporated in the crosslinkable composition, for example, by direct blending with the crosslinkable copolymer. It is preferred to incorporate the phosphorus compound into a masterbatch, for example together with the silanol condensation catalyst.

In a further aspect of the present invention the defined silanol condensation catalyst is absorbed on to a porous particulate solid material prior to blending into the composition. Examples of suitable porous particulate solid materials include silica, silica-alumina, alumina, magnesium oxide, magnesium carbonate, calcium carbonate, calcium phosphate, kieselguhr, celite, charcoal, pumice, fullers earth and the like. Preferably such materials are finely divided, e.g. have a mean particle diameter of not greater than 20 microns.

The composition of the present invention can be used to manufacture crosslinked products using the technology known in the manufacture of articles from conventional silane grafted polymers or silyl copolymers of this type. For example, the composition can be use in blow-moulding, injection-moulding, film-blowing, calendering, extrusion, roto-moulding and extrusion-coating techniques. The composition is particularly preferred for wire and cable coating applications. Wire and cable insulation produced by extrusion coating using the composition of the present invention exhibits improved surface finish.

Articles fabricated from the composition of the present invention can be readily crosslinked by exposure to water, steam or moist air and, in general, relatively fast rates of cure are obtained. The defined silanol condensation catalyst containing dicarboxylic acid functions is generally less easily leached from the composition by the action of water than is the case with conventional silanol condensation catalyst.

The invention is illustrated in the following Examples.

EXAMPLE AND COMPARATIVE TEST

The following ingredients were compounded together to make a masterbatch using a Werner and Pfleiderer ZSK 30 twin screw extruder at a screw speed of 200 revolutions per minute. The total quantity of composition prepared in the Example and in the Test was 10 Kg per run. The extruder barrel temperature was about 140° C. close to hopper zone, increasing to about 190° C. at the extruder head. Extrusion was carried out to give a strand which was chopped to give the pelleted masterbatch.

|  | Parts by weight | |
| --- | --- | --- |
|  | Example | Comparative Test |
| Ethylene/ethyl acrylate copolymer | 93.25 | 93 |
| Conventional antioxidant | 6.0 | 6.0 |
| Dibutyl tin (IV) maleate | 0.75 | — |
| Dibutyl tin (IV) dilaurate | — | 1.0 |

The pelleted materbatch (5 parts by weight) was dry blended with 95 parts by weight of a silyl copolymer prepared by copolymerising ethylene with vinyl trimethoxy silane under high temperature and high pressure conditions using a free radical initiator. The silyl modified polymer contained 1.8 weight % of copolymerised vinyl trimethoxy silane, had a melt index (190° C., 2.16 Kg load) of 0.7 and a density of 923 Kg/M$^2$.

The dry blend was fed into the hopper of a Gottfert extruder equipped with 25 mm screw having L:D of 23:1 and a 5 cm slot-casting die having a 3 mm die gap to produce an extruded tape. The die temperature was 210° C. and the screw speed was 40 RPM. The extrudate was collected on a conveyor belt moving at a rate such that the tape thickness was maintained at 1.5 plus or minus 0.1 mm. The extruder tape was cured by immersion for 1 hr in a water bath thermostatted at 80° C. Visual examination of the tape produced using the composition of the present invention (Example) showed the tape relatively free from surface imperfections and defects caused by premature crosslinking (i.e. crosslinking during extrusion). Tape having similar characteristics continued to be extruded even after 1 hours extrusion time. On the other hand, tape produced from the composition of the Comparative Test exhibited substantial surface irregularity caused by premature crosslinking in the extruder.

Measurement of surface irregularities using a Tallysurf machine gave a value of 1.2 units for the "Example" tape and 1.8 units for the Comparative Test tape thus confirming the results of the visual examination.

I claim:
1. A crosslinkable composition comprising:
   (A) a silyl copolymer prepared by copolymerising monomers comprising ethylene or ethylene and one or more additional monomers of vinyl esters, alkyl acrylates, alkyl methacrylates, olefinically unsaturated carboxylic acids or derivatives of olefinically unsaturated carboxylic acids or vinyl ethers, with an unsaturated silane compound having one or more hydrolysable groups, said silyl copolymer containing 0.1 to 10 weight % of copolymerised units of the unsaturated silane compound and not more than 25 weight % of any copolymerised additional monomer, and a silanol condensation catalyst comprising a dihydrocarbyl tin (IV) carboxylate compound characterised in that the carboxylate units in the tin compound are provided by a dicarboxylic acid.

2. A crosslinkable composition as claimed in claim 1 wherein the carboxylate units in the tin compound are provided by a dicarboxylic acid having the general formula HOOC.X.COOH wherein X is a divalent organic group which contains 1 to 6 carbon atoms.

3. A crosslinkable composition as claimed in claim 1 wherein the silanol condensation catalyst is dibutyl tin(IV) maleate.

4. A crosslinkable composition as claimed in claim 1, 2 or 3 wherein the quantity of tin compound employed is in the range 0.01 to 5% by weight based on the weight of silyl copolymer in the composition.

5. A crosslinkable composition as claimed in claim 1, 2 or 3 wherein the unsaturated silane compound is vinyl trimethoxy silane, vinyl triethoxy silane or vinyl triacetoxy silane.

6. A crosslinkable composition as claimed in claim 1, claim 2, or claim 3, wherein the silyl copolymer contains 0.5 to 5 weight % of copolymerised units of the unsaturated silane compound based on copolymer.

7. A process for preparing a crosslinkable composition by blending together components comprising:
   (A) a silyl copolymer prepared by copolymerising monomers comprising ethylene or ethylene and one or more additional monomers of vinyl esters, alkyl acrylates, alkyl methacrylates, olefinically unsaturated carboxylic acids or derivatives of olefinically unsaturated carboxylic acids or vinyl ethers, with an unsaturated silane compound having one or more hydrolysable groups, said silyl copolymer containing 0.1 to 10 weight % of copolymerised units of the unsaturated silane compound and not more than 25 weight % of any copolymerised additional monomer, and (B) a silanol condensation catalyst comprising a dihydrocarbyl tin (IV) carboxylate compound characterised in that the carboxylate units in the tin compound are provided by a dicarboxylic acid.

8. A process as claimed in claim 7 wherein the defined silanol condensation catalyst is incorporated in the composition as a masterbatch concentrate prepared by compounding the silanol condensation catalyst with a thermoplastic polymer.

9. A process for manufacturing crosslinked articles comprising extruding the composition claimed in claim 1, 2 or 3 to formed a shaped article and treating the article with hot water or steam to cause crosslinking.

10. Extrusion coated wire or cable manufactured by the process of claim 9.

11. A crosslinkable composition as claimed in claim 1, wherein the silyl copolymer (A) is prepared by copolymerising ethylene, an unsaturated silane compound, and one or more other monomers selected from the group consisting of vinyl ester, alkyl(meth)acrylate, olefinically unsaturated carboxylic acids or derivative thereof, and a vinyl ether, and wherein the quantity of the other monomer(s) present in the silane copolymer is up to 40 weight % of the copolymer.

12. A crosslinkable composition comprising:
(A) a silyl copolymer prepared by copolymerising monomers comprising ethylene and an unsaturated silane compound having one or more hydrolysable groups, and
(B) a silanol condensation catalyst comprising a dihydrocarbyl tin (IV) carboxylate compound characterised in that the carboxylate units in the tin compound are provided by a dicarboxylic acid, and
wherein the dihydrocarbyl tin compound is a cyclic diester represented by the general formula:

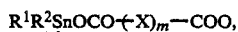

wherein $R^1$ and $R^2$ are the same or different alkyl groups containing 1 to 6 carbon atoms, X is an organic divalent group having 1 to 12 carbon atoms and m is 0 or 1.

13. A process as claimed in claim 7, wherein the silyl copolymer (A) is prepared by copolymerising ethylene, an unsaturated silane compound, and one or more other monomers selected from the group consisting of vinyl ester, alkyl(meth)acrylate, olefinically unsaturated carboxylic acids or derivative thereof, and a vinyl ether, and wherein the quantity of the other monomer(s) present in the silane copolymer is up to 40 weight % of the copolymer.

14. A process for preparing a crosslinkable composition by blending together components comprising:
(A) a silyl copolymer prepared by copolymerising monomers comprising ethylene and an unsaturated silane compound having one or more hydrolysable groups, and
(B) a silanol condensation catalyst comprising a dihydrocarbyl tin (IV) carboxylate compound charcterised in that the carboxylate units in the tin compound are provided by a dicarboxylic acid, and
wherein the dihydrocarbyl tin compound is a cyclic diester represented by the general formula:

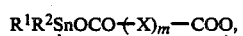

wherein $R^1$ and $R^2$ are the same or different alkyl groups containing 1 to 6 carbon atoms, X is an organic divalent group having 1 to 12 carbon atoms and m is 0 or 1.

15. A process as claimed in claim 7, wherein the silanol condensation catalyst is dibutyl tin (IV) maleate.

16. A crosslinkable composition comprising:
(A) a silyl copolymer prepared by polymerizing monomers comprising ethylene or ethylene and one or more additional monomers of vinyl esters, alkyl acrylates, alkyl methacrylates, olefinically unsaturated carboxylic acids or derivatives of olefinically unsaturated carboxylic acids or vinyl ethers, with an unsaturated silane compound having one or more hydrolysable groups, said silyl copolymer containing 0.1 to 10 weight % of copolymerized units of the unsaturated silane compound and not more than 25 weight % of any copolymerized additional monomer, and
(B) a silanol condensation catalyst comprising a dihydrocarbonyl tin (IV) carboxylate compound characterized in that the carboxylate units in the tin compound are provided by a dicarboxylic acid selected from the group consisting of oxalic, malic, fumaric, adipic, sebacic, and phthalic.

* * * * *

UNITED STATES PATENT AND TRADEMARK OFFICE
CERTIFICATE OF CORRECTION

PATENT NO. : 4,795,786
DATED : January 3, 1989
INVENTOR(S) : Jeffrey D. Umpleby

It is certified that error appears in the above-identified patent and that said Letters Patent is hereby corrected as shown below:

Col. 3, line 1, in the formula there is no line crossing the bracket in the specification ("X")

Col. 3, line 19, should read "of tin and"

Col. 3, line 30, should read "(based on atoms of tin)"

Col. 5, line 63, should read "pelleted masterbatch"

Claim 12, line 12, in the formula there is no line crossing the bracket "(X)"

Claim 14, line 8 and 9, correct the spelling of "characterised"

Claim 14, line 13, there is no line crossing the bracket in "(X)"

Signed and Sealed this

Second Day of May, 1989

Attest:

DONALD J. QUIGG

Attesting Officer

Commissioner of Patents and Trademarks